(12) United States Patent
Cirucci et al.

(10) Patent No.: US 7,481,074 B2
(45) Date of Patent: Jan. 27, 2009

(54) SELF-CONTAINED DISTILLATION PURIFIER/SUPERHEATER FOR LIQUID-FILL PRODUCT CONTAINER AND DELIVERY SYSTEMS

(75) Inventors: John Frederick Cirucci, Schnecksville, PA (US); Derek Miller, Emmaus, PA (US); Paul David Kottler, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 372 days.

(21) Appl. No.: 11/365,290

(22) Filed: Mar. 1, 2006

(65) Prior Publication Data

US 2007/0204650 A1    Sep. 6, 2007

(51) Int. Cl.
*F25J 3/00* (2006.01)
*F17C 7/04* (2006.01)
*F17C 9/02* (2006.01)

(52) U.S. Cl. .......................................... 62/617; 62/48.1
(58) Field of Classification Search ................... 62/617, 62/48.1
See application file for complete search history.

(56) References Cited

U.S. PATENT DOCUMENTS

| | | | | |
|---|---|---|---|---|
| 1,057,052 A | * | 3/1913 | Guye | ........................... 62/617 |
| 2,059,942 A | * | 11/1936 | Lovell | ............................ 62/98 |
| 3,260,060 A | * | 7/1966 | Paulinkonis et al. | .......... 62/47.1 |
| 3,857,245 A | * | 12/1974 | Jones | ........................... 60/651 |
| 4,110,996 A | | 9/1978 | Thompson | |
| 4,689,064 A | | 8/1987 | Boulanger et al. | |
| 5,017,204 A | | 5/1991 | Gottier et al. | |
| 5,144,809 A | | 9/1992 | Chevalier et al. | |
| 5,409,526 A | | 4/1995 | Zheng et al. | |
| 5,426,944 A | * | 6/1995 | Li et al. | ......................... 62/617 |
| 5,461,870 A | | 10/1995 | Paradowski | |
| 5,694,790 A | | 12/1997 | Lavin | |
| 5,802,871 A | * | 9/1998 | Howard et al. | ................. 62/627 |
| 5,983,665 A | | 11/1999 | Howard et al. | |
| 6,349,566 B1 | | 2/2002 | Howard et al. | |
| 6,442,969 B1 | * | 9/2002 | Rojey et al. | .................... 62/618 |
| 7,090,816 B2 | * | 8/2006 | Malhotra et al. | ............. 423/359 |

FOREIGN PATENT DOCUMENTS

EP          0 949 470 A      10/1999

* cited by examiner

*Primary Examiner*—William C Doerrler
(74) *Attorney, Agent, or Firm*—Geoffrey L. Chase

(57) ABSTRACT

A process and apparatus for the on-site delivery of a gas having improved purity to from a container filled with liquid under pressure and integrated with a purifier. In the process a portion of the liquid is converted to vapor by reducing the pressure in the container and expanding the thus formed vapor through a pressure reducer generating refrigeration. The cooled vapor is warmed against incoming vapor prior to exit from the purifier.

8 Claims, 4 Drawing Sheets

SELF-CONTAINED DISTILLATION PURIFIER/SUPERHEATER FOR LIQUID-FILL PRODUCT CONTAINER AND DELIVERY SYSTEMS

BACKGROUND OF THE INVENTION

Many industrial processes require a reliable source of high purity process gases for a wide variety of applications. Often these gases are stored as liquids or as a liquid-vapor mix under pressure in containers and then delivered to the process point of use under controlled conditions from the containers.

To satisfy the high purity requirements for gaseous products imposed by these industries, particularly the semiconductor industry, various fill operations have been employed. For example, containers employed for storage and delivery are specifically prepared for cleanliness, and elaborate measures are taken during manufacture and product fill to maintain purity standards. Despite these measures the product purity of the respective gases tends to degrade during storage and the resulting degradation products must be removed prior to delivery of the gaseous product for on-site use. Contamination of the gaseous product also may occur during vapor withdrawal through entrainment of particulates. These contaminants also must be removed prior to on-site use.

On-site purifiers and containers with built-in purifiers have been employed for removal of contaminants, e.g., the removal of degradation products and particulates, in order to assure delivery of high purity gaseous product to the point of application. Purifiers employing carbon based and other adsorbents have limited effectiveness for removal of all contaminants and adsorption processes also require periodic adsorbent replacement to avoid sudden breakthrough contamination.

The following articles and patents are representative of the art:

U.S. Pat. No. 5,409,526 discloses an apparatus for supplying high purity fluid from a cylinder by means of withdrawing the fluid from the cylinder through a purification unit containing adsorbents. The purification unit is internal to the cylinder.

U.S. Pat. No. 5,461,870 discloses a self-refrigerated process for cryogenic refrigeration employing a heat exchanger whereby a gas comprised of at least two condensable components having different condensation temperatures is treated in a unitary assembly. The apparatus includes heat exchangers of the purifier type.

U.S. Pat. No. 6,442,969 discloses a process for the separation of gases, e.g., carbon dioxide from methane using reflux exchangers.

U.S. Pat. No. 6,349,566 discloses a purifier system installed within a pressure vessel for the purpose of eliminating headers, collectors and the like.

U.S. Pat. No. 5,983,665 discloses a process for producing liquid methane employing a purifier. A feed gas is cooled in a heat exchanger, partially condensed and then rectified in the purifier.

U.S. Pat. No. 5,802,871 discloses a process for removing nitrogen from a methane gas by cooling, partially condensing and then rectifying the methane in at least one purifier.

U.S. Pat. No. 5,694,790 discloses a process for the rectification of an air stream in a heat exchanger having a first set of passages for separating the components by dephlegmation.

U.S. Pat. No. 5,144,809 discloses a process for the production of nitrogen by cooling a feed gas air stream in an apparatus employing a parallelepipedal heat exchanger.

U.S. Pat. No. 5,017,204 discloses a process for producing helium from a natural gas stream by rectification of the feed gas in a purifier heat exchanger. The system is auto-refrigerated and does not require a heat pump or recycle compressor.

U.S. Pat. No. 4,110,996 discloses a method and apparatus for recovering vapor from a container during the filling thereof. Vapor is collected cooled and condensed. The condensate is separated from the vapor and is used to further cool and condense vapor.

BRIEF SUMMARY OF THE INVENTION

The invention is directed to an improvement in an apparatus and process for delivering gases from a container, particularly the delivery of high purity specialty gases for the electronics and semiconductor industry, from such container. The apparatus is a distillation purification system that is integrated within the storage container or integrated as a compact module in the gas delivery system. In an embodiment of the process for delivery, liquid retained in the container is converted to vapor, partially condensed in a purifier heat exchanger and the vapor fraction scrubbed by the condensate fraction in the dephlegmation zone. The vapor fraction comprised of the more volatile components is warmed in indirect heat exchange against the incoming vapor prior to exiting the purifier. The condensate is returned to the liquid retained in the container. In this self-contained distillation purifier apparatus high volatility gaseous product having improved purity is removed as superheated vapor leaving low volatility components including particulates in the liquid retained in the container.

Significant advantages can be obtained through the use of the integrated purifier/container for delivery of gases, particularly high purity gases for the electronics industry, and these include:

- an ability to decrease the amount of heel that must be disposed of in the delivery of high purity gaseous product. Normally in the delivery process a large heel comprised of contaminated product is generated which cannot be used and often must be discharged to waste;
- an ability to superheat the vapor as it leaves the container and thus minimizing condensation in the line downstream of the container which can be very detrimental to the end-use process;
- an ability to provide to maintain the delivery of a high purity, superheated product to a point of use over an extended period of time;
- an ability to consistently produce high purity product;
- an ability to achieve a very high yield of product in the delivery process using a continuous pathway for vapor and condensate; and,
- an ability to eliminate or minimize the use of an auxiliary heater which is normally provided to provide superheat to the saturated vapor and minimize condensation in the lines.

DETAILED DESCRIPTION OF THE INVENTION

In the on-site delivery of gases to processing centers such as those employed in the semiconductor industry containers are often filled with a liquefied gas off-site and the filled containers delivered to the process facility or the liquefied gas is trucked from the supplier to the process facility and the container filled on-site. The gaseous product remains stored as liquids under pressure until the time of delivery. Delivery of the product gas is effected by reducing the pressure in the container thereby converting a portion of the liquid to a vapor and piping the resulting gas to a point of use. Representative gases delivered in this manner to the electronics industry include $NH_3$, $Cl_2$, $CO_2$, HCl, and cryogens and these gases are particularly suited for delivery by the apparatus described herein.

In an effort to deliver high purity gaseous products demanded by the electronics and semiconductor industry and meet delivery specification, the apparatus described allows for excellent reduction of contaminants of lower volatility and the reduction of particulate matter in the product gas prior to delivery of the product gas to a point of use.

Figure 1:
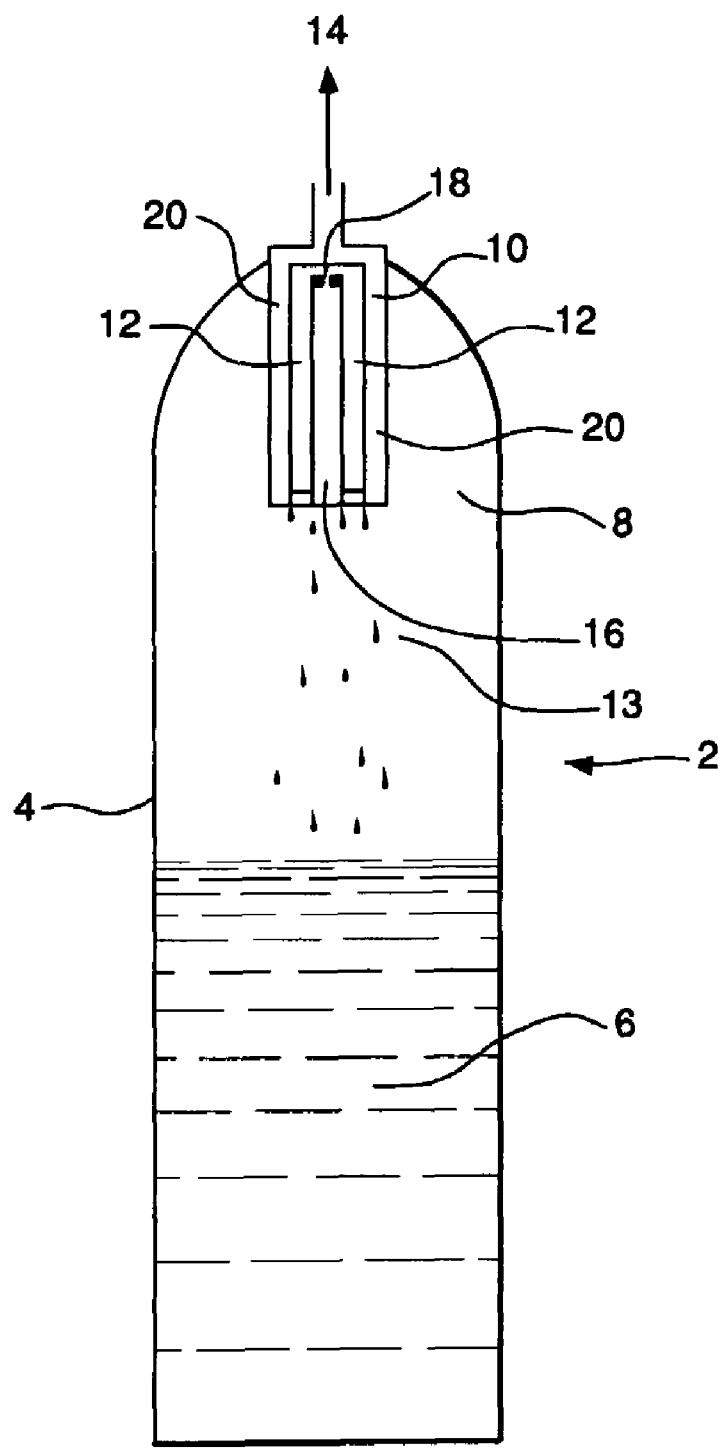
FIG. 1 is a generalized schematic of a self-contained distillation apparatus incorporating a purifier within the delivery container.
Figure 2:
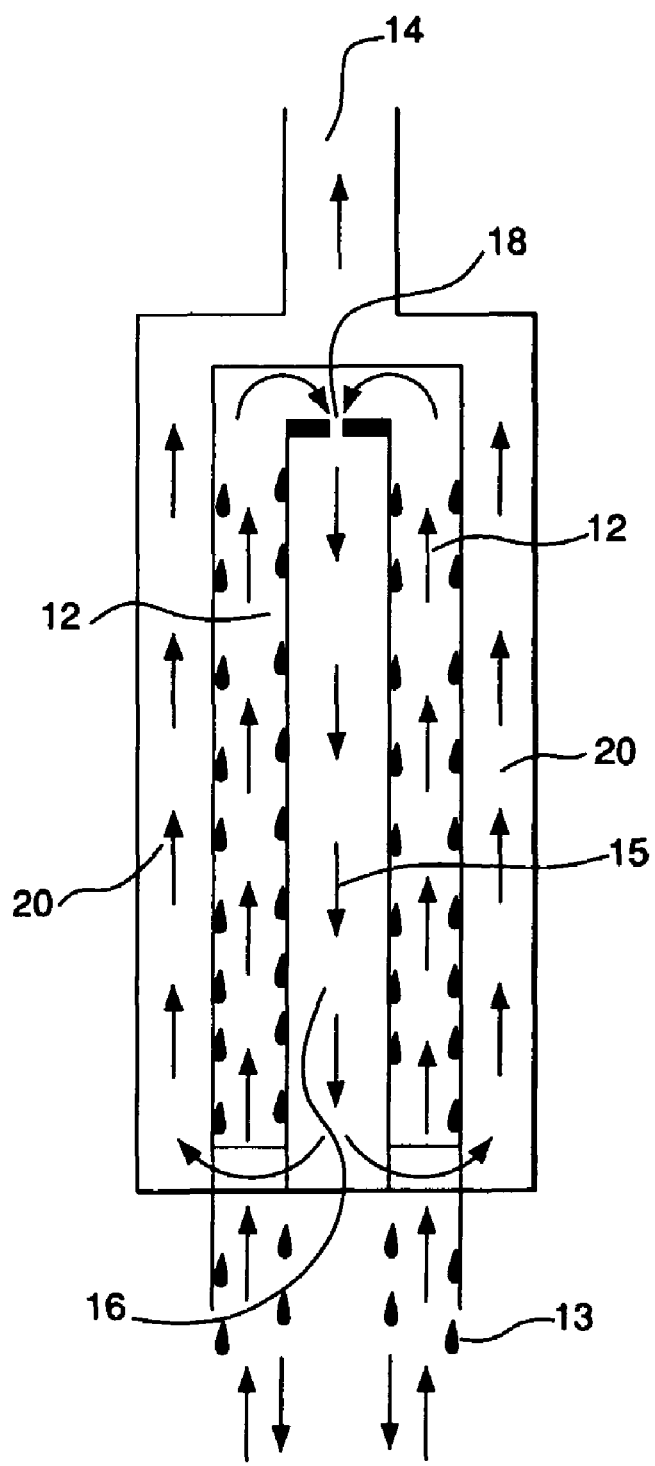
FIG. 2 is an isolated view in cross section of the purifier employed in the container of FIG. 1.

To facilitate an understanding of the apparatus and process reference is made to the figures. FIGS. 1 and 2 illustrates a system 2 comprised of a self contained distillation purifier integrated, i.e., connected in flow communication, physically attached thereto and/or contained within, with a liquid-fill container. (FIG. 2 illustrates the design of the self contained distillation purifier employed in FIG. 1 in greater detail to that shown in FIG. 1.) In system 2, container 4 contains liquid 6, e.g., $NH_3$, under pressure, which is converted from liquid form to gaseous form prior to delivery to a point of use. A head space 8 is generated above liquid 6 as the liquid is converted to gaseous form (vapor) and the resulting vapor is removed from the container.

In the embodiment shown, purifier 10 is located within container 4 thus forming the self contained distillation purifier integrated with a liquid-fill container 2. Purifier 10 is comprised of interior vapor inlet 12, e.g., an annulus ultimately leading to product vapor outlet 14. A continuous pathway is established with respect to the vapor flow from interior vapor inlet 12 to product vapor outlet 14. Internal to interior annular vapor inlet 12 is a center channel 16 in communication with pressure reducer 18. The flow path of center channel 16 leads to external channel 20 surrounding interior annular vapor inlet 12 and then to product vapor outlet 14.

Refrigeration for purifier 10 is provided by establishing flow from the inside of container 4 through product vapor outlet 14 and expanding the vapor fraction generated on conversion of the liquid to vapor through pressure reducer 18 prior to discharge. Expansion of the gas through pressure reducer 18 must provide sufficient cooling of the gas to effect partial condensation of the incoming vapor to purifier 10 prior to its exit. Pressure reductions of from 15 to 200 psi through pressure reducer 18 are typical. The pressure reducing device, i.e., pressure reducer 18, can be of fixed flow resistance, or one of variable flow resistance. The choice is dependant upon the flow demand and variability of conditions required in the process.

In the process of delivering gas to the point of use employing the apparatus of FIG. 1 flow is established resulting in the conversion of a portion of the liquid 6 to vapor. The incoming vapor then is introduced in an upflow direction to interior annular vapor inlet 12 from headspace 8 and partially condensed therein. The upward flowing vapor (reboil) is scrubbed, i.e., rectified, stripped and/or dephlegmated, of heavier (less volatile) components by the downwardly flowing condensate (reflux) in the form of liquid on the interior walls of vapor inlet 12 and droplets 13, (shown in FIG. 2). Particulates entrained in the vapor to interior annular vapor inlet 12 also are scrubbed from the vapor fraction. The condensate in the form of droplets 13, falls into the liquid 6. As a result, the heavier, less volatile contaminants, including particulates, tend to accumulate in the liquid 6 in the bottom of container 4.

The vapor substantially free of contaminants, including particulates, is expanded through pressure reducer 18. The thus cooled vapor 15 is passed through center channel 16 and warmed in indirect heat exchange against incoming vapor in interior annular vapor inlet 12. Vapor flow continuing downwardly in center channel 16 is passed upwardly to external channel 20 surrounding internal annular vapor inlet 12 for further warming and super heating prior to exiting via product vapor outlet 14. Super heating the gas in an amount from 5 to 35° C. often is sufficient to eliminate condensation in the lines downstream of the integrated system.

With the countercurrent scrubbing of the vapor stream by the condensate in the embodiment shown in FIG. 1, a multistage design, i.e., the number of theoretical stages in the separation design is greater than 1, can be achieved. Once the concentration of contaminants in the liquid layer becomes too high sufficient separation of contaminants from product vapor may not be achieved thereby resulting in non specification product. More stages of separation than offered by the installed purifier 10 would be required. At that point container 4 must be removed from service, the remaining contents (heel) emptied and the container filled. Because of the integrated purification system, more of the contaminants can be confined within the heel associated with the delivery process and the amount of heel may be reduced in comparison to prior systems. Thus, the integrated purification system allows for greater product delivery.

Figure 3:
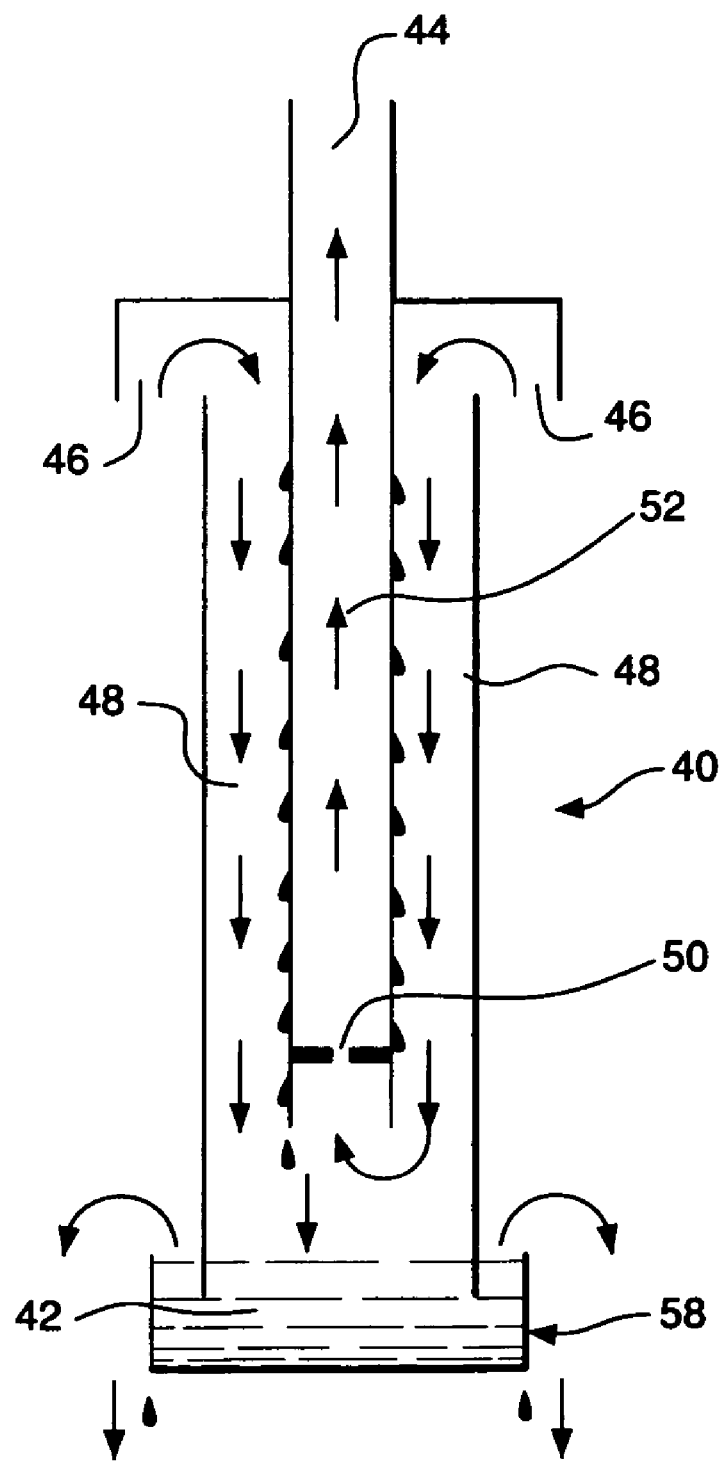
FIG. 3 is an isolated view in cross section of a purifier employing cocurrent flow of vapor and condensate.

FIG. 3 illustrates a variation of the purifier 10 to that in FIG. 1. This embodiment allows for as much as one theoretical stage of separation. More specifically, the purifier 40 is one which can be substituted for the purifier 10 in container 4 of FIG. 1. It has a bottom portion, trap 58, designed for retention of liquid 42. At the upper end of purifier 40 is product vapor outlet 44. As vapor flow is established and the pressure is reduced in purifier 40, relative to the pressure in container 4, liquid 6 is converted to vapor. The vapor enters purifier 40 through inlet 46 and then flows downwardly and is cooled in annular channel 48. Condensate droplets in interior annular channel 48 fall into liquid 42 in the bottom of purifier 40. The level of liquid 42 in purifier 40 for establishing a liquid seal is maintained via trap 58. When the amount of liquid 42 exceeds the design level, the excess overflows into liquid 6 retained in container 4. Vapor exiting interior annular channel 48 is passed though pressure reducer 50 and cooled thereby providing refrigeration for purifier 40. The thus cooled vapor having improved purity is warmed against vapor and condensate in indirect heat exchange with internal annular channel 48 as it passes upwardly through center channel 52. The warmed (superheated) vapor in channel 52 then is passed through product vapor outlet 44 to the point of use.

The design in FIG. 3 results in effecting partial condensation of vapor in interior annular channel 48 causing the condensate to flow in cocurrent relationship to vapor in interior annular channel 48 instead of countercurrent relationship as in FIG. 1. Absent the countercurrent scrubbing of the vapor by falling condensate as shown in FIG. 1, the effectiveness of the separation is reduced thereby reducing the amount of theoretical stages of separation possible. The embodiment depicted in FIG. 3 may be preferred for fit inside container configurations with space limitations.

Figure 4:
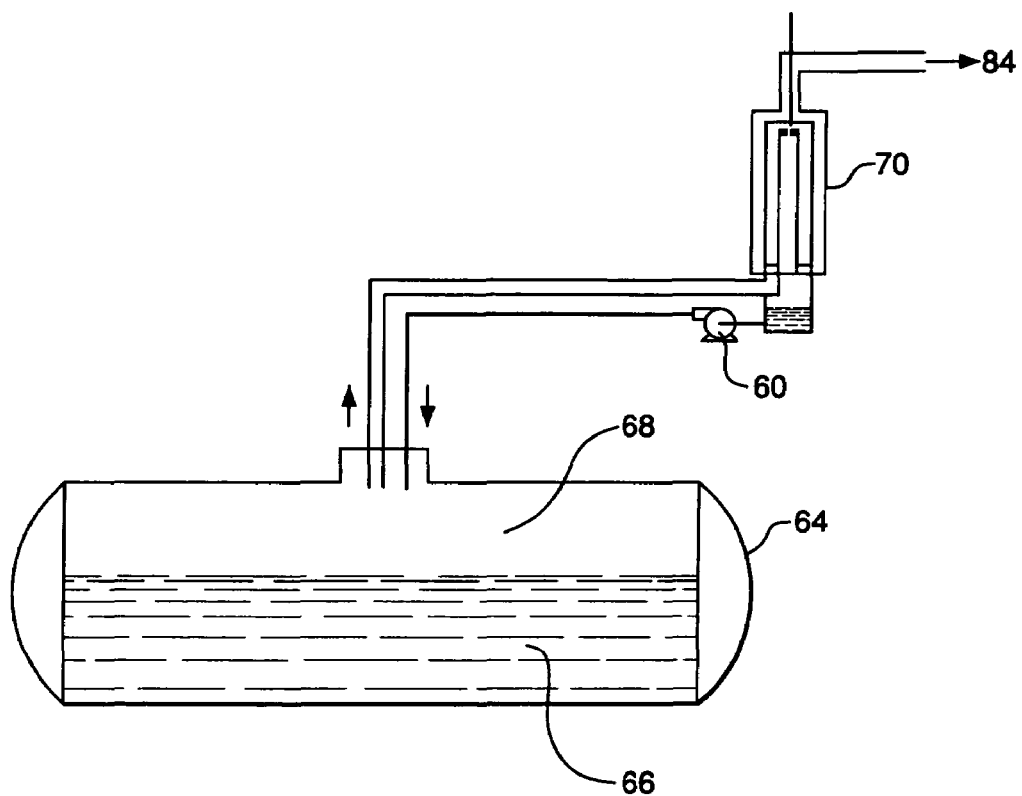
FIG. 4 is a view in cross section of a self-contained distillation purifier employing the purifier of FIG. 1 fitted externally to a horizontal container designed for bulk storage and/or delivery of product.

FIG. 4 depicts a self-contained purifier of the type in FIG. 1 which is used as an external retrofit of the purifier to container 64. Purifier 70 is generally located adjacent container 64, and, as with the prior systems, it is driven by the energy within the liquid 66 in container 64. Pump 60 is used to convey liquid condensate back to container 64. However, depending upon the design configuration the condensate may be returned to container 64 via gravity feed. The advantage of this retrofit of an integrated embodiment is the on-site conversion of storage and delivery equipment for bulk gas distribution. Otherwise, all aspects of the FIG. 1 integrated purification system is identical in operation to the FIG. 4 design.

Summarizing the process steps for purification and delivery of product gas from container 64 comprises effecting the conversion of liquid to vapor or "boil-up" 68 from the liquid reservoir 66 in container 64 via pressure reduction. The energy in the liquid in the container, coupled with ambient heat leak, is used to drive the separation. Essentially then, the purification process is adiabatic. Heat can be supplied via auxiliary heaters (not shown in the drawings), for example as may be necessary with the delivery of $NH_3$, to maintain the system in a quasi-steady-state condition. The ability to superheat the product vapor or gas prior to exit 84 from the purifier minimizes the need for line heaters now used for on-site delivery.

In the preferred embodiment of the invention as described in FIG. 1, an upwardly flowing vapor contacts a downwardly flowing condensate which strips the heavies and particulates therefrom. The condensate containing scrubbed particles and less volatile components is returned to the liquid at the bottom of container 4. All of this is done in a continuous pathway for the vapor allowing for ease of construction.

Various modes of construction of the purifier may be used and the description that the vapor inlets and channels are annular is one of convenience and preferred. For example, rectangular construction may also be employed.

The following examples are provided to illustrate various embodiments of the invention and are not intended to restrict the scope thereof.

EXAMPLES 1

In order to evaluate the predicted separation performance of the various designs of the self-contained distillation purifiers, water removal from ammonia is used as the representative system. The saturated vapor flash from the container reservoir is assumed to have a molar concentration of 5 ppm water. Pressure letdown is set at 129 psia→65 psia for a nominal product at a withdrawal rate of 1 lb mol/hr. Adiabatic purifier operation is employed with heat input for boil-up and superheat provided by ambient heat leak into the container.

The evaluations include the countercurrent design of FIG. 1 and the cocurrent design of FIG. 3. The reductions in water content are measured against a system employing the inherent single theoretical stage achieved by liquid vaporization from the container reservoir.

The initial separation results show that the self-contained distillation purifier described in FIG. 3 provides a ~20-fold reduction in the water content of ammonia product. The countercurrent self-contained distillation purifier described in FIG. 1 provides a ~7000 fold reduction. Both configurations provide for heat removal from the discharge product so that the exiting vapor is less likely to condense downstream in delivery lines. More specifically about 27 degrees of superheat (above dew point) is provided by the self-contained distillation purifiers for these conditions.

Summarizing, with increased separation efficiency, one has the opportunity to deliver a high purity product over an extended period of time. This results in the delivery of a more consistent product, favorable to industries such as the electronics industry.

The invention claimed is:

1. A process for the on-site delivery of a product gas having improved purity to a point of use from a container filled with liquid having less volatile contaminates, including particulates, under pressure which comprises:

(a) integrating a purifier with the container;
(b) converting at least a portion of the liquid to vapor in said container;
(c) introducing the vapor from a headspace within said container to an interior vapor inlet in said purifier;
(d) partially condensing said vapor within said interior vapor inlet thereby generating a vapor fraction and a condensate fraction and under conditions for allowing the vapor fraction to be stripped of said less volatile contaminates, including particulates, by said condensate fraction thereby generating a cooled gas having improved purity and a condensate fraction rich in less volatile contaminates, including particulates;
(e) warming the thus cooled gas having improved impurity in indirect heat exchange against the vapor fraction and condensate fraction within the interior vapor inlet forming a superheated product gas of improved purity;
(f) removing the superheated product gas of improved purity from the purifier through a product vapor outlet for delivery to a point of use;
(g) returning said condensate fraction rich in less volatile contaminates, including particulates, to the container; and,
(h) removing the container integrated with said purifier from service when the concentration of less volatile contaminates, including particulates becomes too high in said container to permit separation of less volatile contaminants, including particulates, and produce a superheated product vapor of improved purity.

2. A self-contained distillation apparatus incorporating a purifier within a delivery container and suited for the delivery of a superheated product gas having improved impurity which comprises:

a container suited for holding a liquid under pressure;
a purifier integrated within said container, said purifier having at least one interior vapor inlet consisting of an annulus surrounding a center channel, said interior vapor inlet communicating at one end with a head space within said container and with an inlet to said center channel at another end of said interior vapor inlet;
a pressure reducer associated with said purifier for supplying refrigeration for said purifier;
an exterior channel surrounding the interior vapor inlet and in indirect heat exchange therewith and wherein an end of said exterior channel communicates with an outlet of said center channel and communicates with a product vapor outlet at another end of said exterior channel; and,
a condensate return from interior vapor inlet to said container, whereby a flow path is established from the container through said interior vapor inlet, then through said center channel, and then through said exterior channel to said product vapor outlet.

3. The process of claim 1 wherein the pressure is reduced in an amount of from 15 to 200 psi.

4. The process of claim 1 wherein the contacting of said vapor fraction with condensate is in a countercurrent direction.

5. The process of claim 1 wherein the contacting of said vapor fraction with condensate is in a cocurrent direction.

6. The process of claim 1 wherein a super heat of from 5 to 35° C. is provided to the superheated gas when removing from the purifier.

7. The apparatus of claim 2 wherein the pressure reducer is disposed at the inlet to said center channel.

8. The apparatus of claim 2 wherein the purifier has a bottom portion capable of retaining a liquid and forming a liquid seal.

* * * * *